Dec. 13, 1960     I. N. HUFFMAN     2,964,201
HOLDER
Filed June 26, 1957
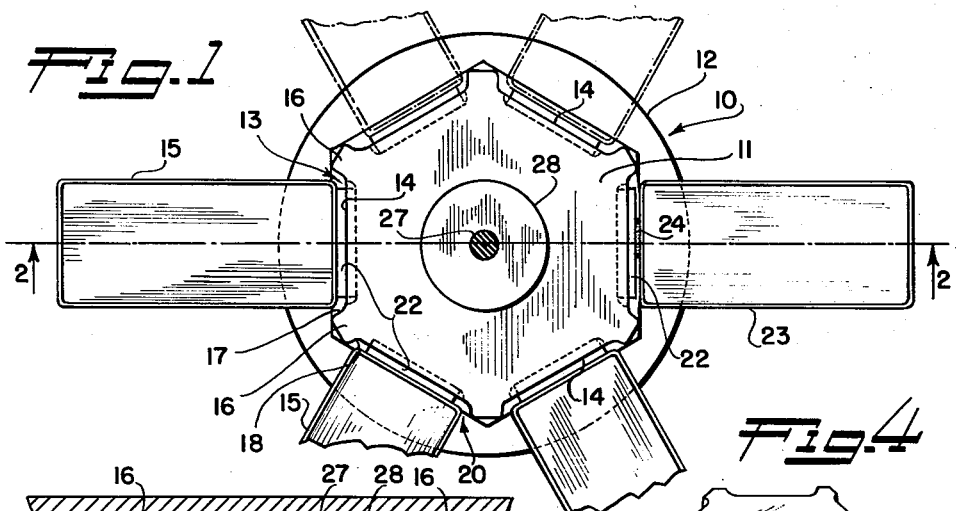
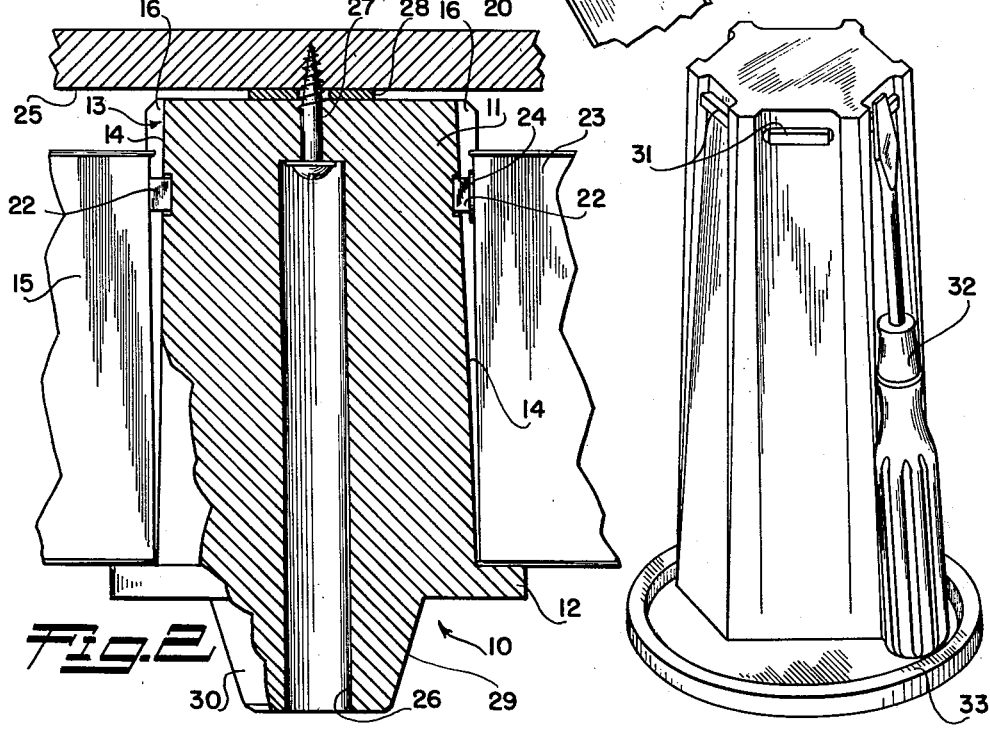
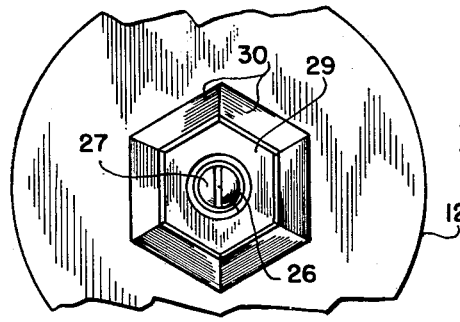
INVENTOR.
IRVIN N. HUFFMAN
By R.E. Geauque
Attorney

United States Patent Office 2,964,201
Patented Dec. 13, 1960

2,964,201

HOLDER

Irvin N. Huffman, 2117 Buena Vista, Burbank, Calif.

Filed June 26, 1957, Ser. No. 668,131

2 Claims. (Cl. 211—115)

This invention relates to a utility holder and more particularly to a holder suitable for readily carrying detachable objects such as containers, hand tools, etc., in a convenient and readily accessible fashion.

It has been the conventional practice to employ a variety of shelves, holders, clips and clamps to support and store various objects such as bottles, cans, hand tools, etc. Difficulties have been encountered when employing these conventional practices which partially stem from the fact that the objects are difficult to attach to a supporting member and an orderly system of storage is sometimes neglected. Furthermore, a need has long existed for a utility holder which is susceptible for use with non-metallic objects as well as metallic objects.

These difficulties have been obviated by the employment of the present invention in which there is provided a rotatably mountable body having a plurality of recesses adaptable to receive an object. Each recess is provided with magnetic means for maintaining the object in a fixed position with respect to the body and each recess is located on the body so that an object supported on one recess does not interfere with the accessibility of other objects supported in adjacent recess.

It is an object of the present invention to provide an effortless mounting means for supporting metallic as well as non-metallic objects in a convenient spaced relationship.

Another object of the present invention is to provide a minmum supporting means for a plurality of metallic or non-metallic objects which maintains each of the plurality of objects in a fixed position relative to adjacent objects.

Still a further object of the present invention is to provide a utility holder having a plurality of individual recesses for supporting objects in an upright manner so that the objects are suspended from the recesses.

These and other objects will be more readily described and understood with reference to the accompanying drawings wherein:

Figure 1 is a plan view of a utility holder in accordance with the present invention employed to detachably support a plurality of objects such as containers;

Figure 2 is an elevational view in section of the utility holder of Figure 1 taken in the direction of arrows 2—2;

Figure 3 is a fragmentary bottom view of the holder of Figure 1 and of Figure 2; and Figure 4 is perspective view of a modified holder employed to support a variety of implements such as hand tools.

With respect to Figures 1 and 2, utility holder 10 is provided in accordance with the present invention which chinery to form the plurality of recesses. Lip 12 is inteplurality of receptacles such as receptacle 13. Central body 11 may be of any suitable material which can be formed to provide the receptacles such as molded plastic, for example, or the body may be of materials such as wood which may be suitably worked by machinery to form the plurality of recesses. Lip 12 is integrally formed with the main body of the holder adjacent the bottom thereof and a plurality of surfaces such as surface 14 are provided which tapers towards lip 12 from the top of the main body 11. Each surface 14 is associated with a recess.

Each recess is adaptable to receive a container, such as container 15, which may be employed for enclosing spices, nails, cards, etc. To insure that the containers are readily accessible and do not interfere with each other either visually or physically, the plurality of surfaces 14 of the main body are configured to form a hexagon shape so that a recess for each container may be accommodated on each side of the hexagon. The formation of tapered surface 14 in each recess associated with one side of the hexagon provides a protrusion 16 common to adjacent recesses so that a surface 17 of protrusion 16 is associated with recess 13 and a surface 18 of protrusion 16 is associated with recess 20. The tapered surface 14 and the surfaces of the protrusions aid in guiding a container within the recess. It should be understood that the hexagonal shape of the main body 11 is by way of illustration and that any type of polygonal configuration may be employed.

Each recess is provided with a magnet 22 which is cemented into a recess 22 formed in each tapered surface 14. The location of the magnet in each recess is very important and should be located near the top of the main body 11 so that the magnetic flux of the magnet will attract the container in an effort to overcome the weight of the container and therefore adequately support the container on lip 12.

Figure 2 shows a container 23 composed of non-metallic materials such as cardboard or glass and therefore, a metallic member 24, such as a washer, is affixed to one side of the container by suitable means as cementing or taping. This magnetic responsive metal member is placed on a container in a location substantially at a point where it will mate with magnet 22 upon the placement of a container in a recess.

The holder may be mounted to be underside of a cabinet shelf 25, for example, by providing an internal bore 26 extending partially through the center of the main body 11 and inserting a screw 27 through the bore, main body 11 and into the underside of shelf 25. A washer 28 may be employed as a spacer to reduce friction which might exist between the top surface of the holder and the underside of the shelf during rotation. Main body 11 is provided with an integrally formed knob 29 arranged below lip 12 which may be employed for manually rotating the utility holder when the holder is mounted beneath the shelf. Knob 29 is configured to provide a series of surfaces 30 arranged adjacent to each other so that the knob may be easily grasped to manually rotate the holder.

Referring to Figure 4, substantially the same utility holder as shown in Figures 1, 2 and 3 is employed with the exception that main body 11 is elongated and a plurality of magnets such as magnets 31 are located closer to the top portion of the main body so that implements such as hand tool 32 may be supported by the holder rather than cans or bottles which do not require the height. The embodiment of Figure 4 further includes a small retaining wall 33 provided about the periphery of lip 12 to offer additional support for the hand tools. In this embodiment, a knob such as knob 29 employed in Figure 3 is lacking so that the holder may be placed on a flat surface of a work bench or the like rather than mounted to the underside of a shelf.

Actual practice will be described with reference to Figures 1 and 2 wherein container 15 is placed in close proximity to recess 13 formed in the main body 11 of the holder 10 in a fashion whereby the bottom of the container rests upon lip 12. The container is tipped slightly on the lip so that one side of the container enters into the recess between the pair of spaced protrusions 16. As the container reaches the magnetic flux field associated with magnet 22, the container is drawn into engagement with the magnet and held in place by the strength of the magnetic field. In the event that the container is composed of non-metallic material, the container will be held in place by the attraction of the magnet for a magnetic material member 24 carried by the container 23.

Having described only a typical form of the present invention, I do not wish to be limited to the specific details herein set forth, but wish to reserve to myself any variations or modifications that may appear to those skilled in the art and fall within the scope of the following claims.

I claim:

1. A utility holder to be carried beneath a shelf for supporting objects comprising a main body having a central bore extending therethrough of a substantially polygonal configuration, a plurality of recesses formed about the periphery of the body adapted to receive at least one object, a plurality of protrusions integral with the body and being equally spaced apart to separate and define adjacent recesses, a pair of flat angular surfaces provided on each protrusion whereby each surface faces a different recess for guiding an object within the recess, a tapered wall formed in the body to form a back surface for each recess interfering with the insertion of an object into the recess, the width of the tapered wall defining the width of the recess, a circular lip carried on the bottom of the body projecting beyond the body configuration adapted to support a portion of an object inserted into a recess, magnetic means secured in each recess to the tapered wall in fixed spaced relationship to the protrusions whereby the magnetic means cooperates with the lip and the protrusions to hold the object on the holder within a given recess, screw attachment means retractably disposed within the central bore of the main body including a portion of the main body having a reduced bore passing the screw attachment means and connected to the underside of the shelf for rotary movement of the main body, and a gripping knob integrally formed with the main body beneath the lip having a bore co-axial with and in communication with the central bore which provides access to the screw attachment means for easy removal thereof, the gripping knob having tapered sides of polygonal configuration for allowing manual rotation of the holder in cooperation with the screw attachment means.

2. A utility holder to be carried beneath a shelf for supporting objects comprising a main body having a substantially polygonal configuration and having a central bore extending therethrough, a plurality of recesses formed about the periphery of said body adapted to receive at least one object, a plurality of protrusions integral with said body and being equally spaced apart at the corners of said polygonal configuration, a pair of flat angular surfaces provided on each protrusion whereby each surface faces a different recess for guiding an object into said recess, a circular lip carried on the bottom of said body and projecting beyond the body configuration, said lip adapted to support a portion of an object inserted into one of said recesses, magnetic means secured in each recess in a fixed spaced relationship to said protrusions whereby the magnetic means cooperates with the lip and the protrusions to hold the object on the holder within one of said recesses, screw attachment means retractably disposed within the central bore of the main body including a portion of said main body having a reduced bore passing the screw attachment means and connecting to the underside of the shelf for rotary movement of the main body, and a gripping knob integrally formed with the main body beneath the lip and having a bore co-axial with and in communication with the central bore which provides access to the screw attachment means.

References Cited in the file of this patent

UNITED STATES PATENTS

| | | |
|---|---|---|
| 489,665 | Williams | Jan. 10, 1893 |
| 932,931 | Willmann | Aug. 31, 1909 |
| 2,457,032 | Case | Dec. 21, 1948 |
| 2,488,087 | Kravitt | Nov. 15, 1949 |
| 2,754,166 | Ohm | July 10, 1956 |

FOREIGN PATENTS

| | | |
|---|---|---|
| 15,253 | Great Britain | July 25, 1899 |